3,063,836
POROUS BEARINGS OF ALUMINUM AND OTHER METALS
Samuel Storchheim, Forest Hills, N.Y., assignor to Alloys Research & Manufacturing Corporation, New York, N.Y., a corporation of Delaware
Filed Aug. 19, 1960, Ser. No. 50,693
3 Claims. (Cl. 75—224)

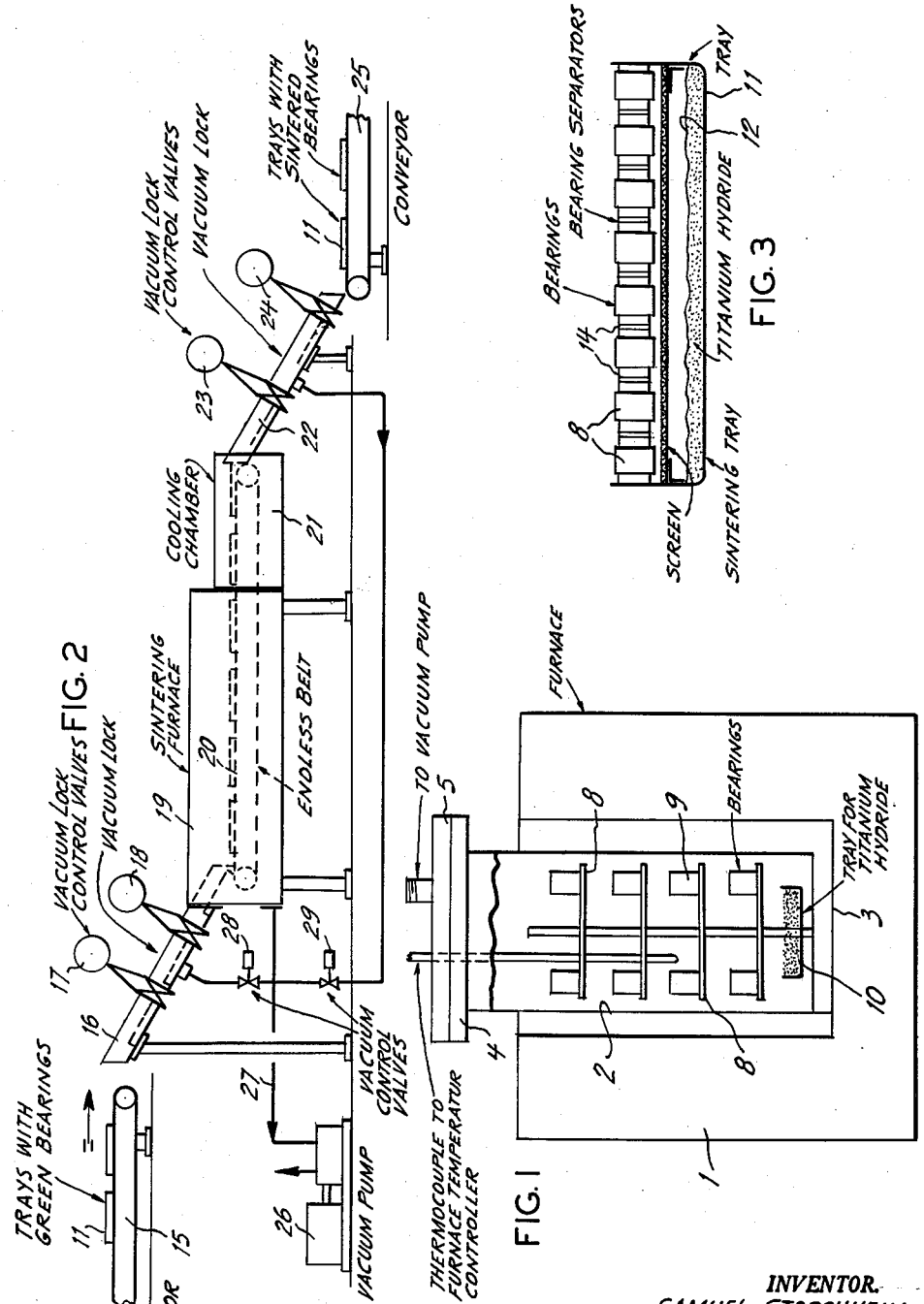

The present invention is directed to the manufacture of porous metal bearings, and more particularly to such bearings made of aluminum powder and having improved properties.

Bearings have been made of aluminum powders by conventional powder metallurgical techniques involving cold pressing and sintering, but it has been quite difficult to produce satisfactory bearings thereby. Such bearings exhibited unequal shrinkage and distortion due to the process used in the production thereof. Some of the prior bearings had a tendency to heat up in use due to the relatively low heat conductivity. The bearings in many cases were lacking in strength resulting in excess breakage thereof.

The present invention is intended and adapted to overcome the difficulties encountered in the prior art and the deficiencies inherent therein, it being among the objects of the invention to provide a process of the character described which will result in bearings having a longer running life than prior bearings.

It is also among the objects of the invention to provide bearings of powdered metal which will have higher retention of oil and improved lubricating effectiveness.

It is further among the objects of the invention to devise a process which is simple and effective, and wherein the operation is continuous and substantially fully automatic.

This invention overcomes the difficulty encountered in prior methods through use of an extremely dry hydrogen stream generated by the decomposition of a metallic hydride to remove diffusion inhibiting oxide films on aluminum powder particle surfaces. Once such surface films are removed, the aluminum powder compact can be sintered in much the same manner as can compacts of other materials. It is essential, however, that the oxide films do not form again once having been removed, as such films too would interfere with sintering. To prevent recurrence of oxide film formation, sintering is conducted in vacuum. By maintaining an extremely low pressure around the bearings, it is also possible to reduce the partial pressure of water vapor in the sintering atmosphere, thus facilitating its removal from the bearing as it is formed. It is the extremely dry hydrogen released by metal hydrides which is effective as a reducing agent. This has several advantages: It permits low cost hydride, such as calcium hydride to be used and it makes the use of a specific range of hydride particle sizes unnecessary.

When hydrogen is generated as described herein, the bearings are surrounded by a hydrogen atmosphere where the hydrogen concentration at each bearing is governed only by the partial pressure of hydrogen in the atmosphere. This results in more uniform sintering with less shrinkage and distortion.

In the accompanying drawing constituting a part hereof and in which like reference characters indicate like parts, FIG. 1 is a diagrammatic view of an apparatus for batch vacuum sintering of porous aluminum bearings according to the invention, some parts being broken away for clearness;

FIG. 2 is a diagrammatic view of a furnace system for the continuous vacuum sintering of porous aluminum bearings; and FIG. 3 separately illustrates the sintering tray used in the system shown in FIG. 2.

Furnace 1 of suitable type and suitably heated, has reaction vessel 2 fitted therein. It has closed bottom 3, the top being open and provided with flange 4. Cover plate 5, bolted or otherwise secured to flange 4, forms a tight seal. An opening in plate 5 is connected to a source of vacuum 6, and a thermocouple 7 is inserted thru plate 5 to assist in the control of the temperature in reactor 2.

A series of superposed spaced trays 8 are mounted within reactor 2, said trays having placed thereon bearings 9 to be treated. Below these trays is a pan or receptacle 10 which is adapted to hold a hydride, such as titanium hydride.

In the operation, bearings 9 are racked in several tiers vertically with pan 10 of titanium hydride at the lowermost level. The reaction vessel 2 is then sealed with flanged cover plate 5, evacuated and lowered into temperature controlled furnace 1. The hydrogen evolved passes over the bearings and they sinter to the desired porosity. When sintering has been completed, the vessel is removed from the furnace and allowed to cool to about 200° F. under vacuum. The vacuum vessel can then be opened and the sintered bearings removed.

To sinter bearings on a large scale, a continuous vacuum sintering furnace is used as shown in FIGURE 2. It includes a sintering tray, shown separately in FIG. 3, 11 having a supply of hydride 12 therein. Screen 13 is placed over the upper part of tray 11 and bearings 8, separated by separators 14, rest on screen 13. The tray is placed on conveyor belt 15 to be fed in inclined entrance chamber 16 fitted with a vacuum lock consisting of control valves 17 and 18. The lower end of chamber 16 fits into one end of sintering furnace 19 having a conveyor belt 20 therein. The other end of the sintering furnace communicates with cooling chamber 21 which, in turn, communicates with exit chamber 22. A vacuum lock is provided by a pair of spaced control valves 23 and 24. Trays emerging from chamber 22 are removed by belt 25. Vacuum is maintained in the system by vacuum pump 26 having connection 27 to furnace 19. Control valves 28 and 29 are connected to the respective locks in chambers 16 and 22.

In operation, green bearings are placed in trays 11 and prevented from moving on the tray by "egg-crate" dividers 14. The bearings 8 are supported on screen 13 and beneath the screen is the layer 12 of titanium hydride or calcium hydride. During sintering, the hydride decomposes, liberating active hydrogen which reduces surface oxides on the powder particles. The trays 11 are carried into the inlet end of furnace 19 by conveyor belt 16. Here, they are dropped onto an inclined chute and stop at control valve 17. With valve 18 closed, valve 17 opens and allows tray 11 to fall into the vacuum lock. Valve 17 then closes and the lock is evacuated via vacuum control valve 28. When the pressure in the vacuum lock is equal to the pressure in the furnace, valve 18 opens and allows tray 11 to fall on continuous belt 20 in sintering furnace 19. Use of a vacuum lock prevents pressure cycling in the furnace and permits continuous operation.

The speed of the belt is such that the bearings are sintered by the time they reach the end of the furnace. After the bearings have been cooled, they are discharged through a second vacuum lock at the end of the furnace. All vacuum valves are controlled by a cycle timer so that the entire operation is fully automatic and continuous.

An alternate technique for producing ultra-dry hydrogen and one which does not involve the use of titanium hydride immediately beneath the bearings involves generais done by thermally decomposing a relatively cheap hydride, such as calcium hydride, in a separate hydrogen generator. Such a generator is under separate temperature control so that the hydrogen flow is accurately controlled.

A metal oxide at any given temperature in a hydrogen atmosphere will behave in accordance with the laws of chemical equilibrium. The following general chemical equation can then be written:

$$MO + H_2 \rightleftharpoons H_2O + M$$

The symbol M stands for any given metal. It is a well known fact that when a system is in chemical equilibrium and the equilibrium is disturbed, the system will react in such a manner as to restore the equilibrium. Thus for the system defined by the above equation, should the system be in equilibrium and should water vapor be removed, the reaction would proceed to the right. Conversely, if water vapor should be added, metal oxide would form, the reaction proceeding to the left. The concentration of metal oxide at any given temperature will be a function of the moisture concentration in the sintering atmosphere and the constant defining the chemical equilibrium. In the case of aluminum, the metal oxide is very refractory; i.e., difficult to reduce with hydrogen. One could hope to reduce the oxide either by using a very large flow of dry hydrogen past the aluminum parts being sintered, or by using an ultra dry hydrogen. Since commercially available hydrogen always has detectable quantities of moisture, other sources of hydrogen are required. When a metal hydride such as titanium or calcium hydride is thermally decomposed, pure hydrogen, completely free of water vapor is produced. The presence of such dry hydrogen permits appreciable quantities of surface oxides to be reduced.

Satisfactory bearings have been produced from aluminum powder having the following particle size distribution.

| U.S.S. sieve number: | Weight percent |
|---|---|
| +100 | 23.0 |
| 100/140 | 20.8 |
| 140/200 | 26.7 |
| 200/270 | 17.5 |
| 270/325 | 12.0 |
|  | 100.0 |

It is also of importance that the aluminum powders have the proper particle shape. Spherical powders are difficult to consolidate because individual particles do not tend to interlock under pressure. Irregularly shaped powders when pressed at 3 to 6 t.s.i. (tons per square inch) form a firm handleable compact. To utilize spherical powders, it is necessary to distort the powders before use so that individual particles are irregular enough to interlock and form handleable compacts. The invention includes a technique for distorting spherical particles so that they will consolidate and yield satisfactory green compacts. This may be done in either of several ways: by passing the powders cold through a rolling mill having zero clearance between the rolls and operating at 50 to 70 f.p.m. (feet per minute) by ball milling, by hammer milling or by stamp milling. The powders may be distorted in the as-received condition, or as individual fractions of the original powder mixture. The distorted fractions may be used alone or as a blend with varying amounts of undistorted material.

The aluminum powder is then mixed with 6 w/o −325 mesh tin which acts as a solid phase lubricant and green pressed at 4 t.s.i. The green bearings are then sintered at 600 to 625° C. for 1 hour at a vacuum of 25 to 75 microns of mercury. Titanium hydride in an amount equal to 4 w/o of the bearings is added to the sintering drogen during the sintering operation.

The sintered bearings are impregnated with oil by immersing the bearings in oil in a vacuum chamber. The chamber is then evacuated for 15 minutes or until air no longer flows out of the bearings. When the pressure in the evacuation chamber is returned to atmospheric, the oil immediately fills the evacuated pores of the bearings. The bearing is then coined, that is, brought to final size by pressing in a die at 4 t.s.i. This completes the fabrication cycle.

Aluminum alloy bearings have longer running lives than comparable bronze bearings when tested at the same load and shaft velocities. Aluminum alloy bearings subjected to pressure-velocity (PV) tests at a PV factor of 50,000 have had lives 50 times greater than that of the bronze counterparts tested at identical conditions. Whereas the bronze bearings overheated seized to and scored the shaft, the aluminum alloy bearings continued functioning satisfactorily until deliverately removed from the test apparatus.

Aluminum bearings because of their superior heat conductivities tend to operate at much lower temperatures in service. It has been observed for example that bronze bearings reach equilibrium operating temperatures of 300° F. in service whereas aluminum alloy bearings of identical dimensions operating at the same load and velocity conditions and mounted on the same shaft reach equilibrium operating temperatures of 170° F. Since low temperatures favor retention of oil by the bearing and minimize oil breakdown, it follows that aluminum alloy bearings will tend to be longer lived than bronze bearings.

Aluminum alloy porous bearings are only 25% the weight of comparable bronze bearings thereby rendering them applicable where weight of components is an important factor; missiles and space vehicles for example. The forming and coining pressures for these bearings are perhaps 1/10 those normally used in fabrication of bronze or iron bearings. The lower compacting pressures reduce die maintenance and permit the use of less expensive materials in die fabrication.

The quantity of oil which a bearing contains and the ease with which the contained oil can flow to the load bearing surfaces is an important factor in bearing life. Two tests have been devised to evaluate these bearing properties; the first is a wickability test which is a measure of the oil absorption as a function of time, and the second involves determination of that fraction of the total bearing volume occupied by an interconnecting porous structure. Aluminum alloy bearings can absorb as much as 12% of their dry weight as oil. The oil absorption is a function of the forming pressure, the oil absorption for bearings formed at 3 t.s.i. being twice that for bearings formed at 8 t.s.i. The high density bearings; i.e., those formed at the high pressures, tend to be shorter lived than those formed at lower pressures because they contain less oil and because the oil flows to the bearing surfaces at a reduced rate.

The aluminum bearings are strong and tough and can be forced into the bearing housing with as much as a 0.005″ press-fit without damaging the bearing in any way. The aluminum bearings possess an additional advantage in that they conform to the shape of the shaft on which they may be mounted. Bronze bearings, on the other hand, are so rigid that they cannot be so mounted without damage thereto. Therefore, clearances, tolerances, and out-of-roundness tend to be critical in the case of bronze bearings but they are not with aluminum bearings.

Temperature fluctuations in service combined with differences in thermal coefficients of expansion between bearings and bearing housings can cause loosening of the nearings within their housings. Tests have shown that the ability of a bearing to remain tight within its of press-fit employed. A press-fit of 0.005″ will, in general, eliminate loosening of the bearing during as many as seven alternate cycles of heating to 250° and cooling to room temperature.

The invention is not limited to any particular source of dry hydrogen, although the use of a hydride is preferred. In the present operation there is introduced enough hydrogen to raise the pressure of the system from about 50 to about 100 microns for about 5 to 10 minutes. There after, the pressure returns to approximately its original value.

In general, it is advisable to use commercial grades of aluminum and of tin. Also, the particle sizes may vary breatly and generally powders of —100 mesh are used in the bearings. The alloys of aluminum are usually those which are described in the literature and are suitable for the present purpose.

What is claimed is:

1. A method of making porous metal bodies comprising the steps of compacting metal particles taken from the class consisting of aluminum and its alloys into a compact within an evacuated chamber in the presence of a hydrogen-liberating hydride in a temperature range at which said hydride is thermally decomposed to generate extremely dry hydrogen which diffuses through said green compact to reduce surface oxides on the particles thereof, and continuing to heat the oxide-free particles of said compact until they are sintered.

2. A method, as set forth in claim 1, wherein said hydride is titanium hydride.

3. A method, as set forth in claim 1, wherein said hydride is calcium hydride.

References Cited in the file of this patent

UNITED STATES PATENTS

| | | |
|---|---|---|
| 2,167,240 | Henzel | July 25, 1939 |
| 2,254,549 | Small | Sept. 2, 1941 |
| 2,776,887 | Kelly et al. | Jan. 8, 1957 |

FOREIGN PATENTS

| | | |
|---|---|---|
| 503,874 | Great Britain | Apr. 17, 1939 |